Figure 1:
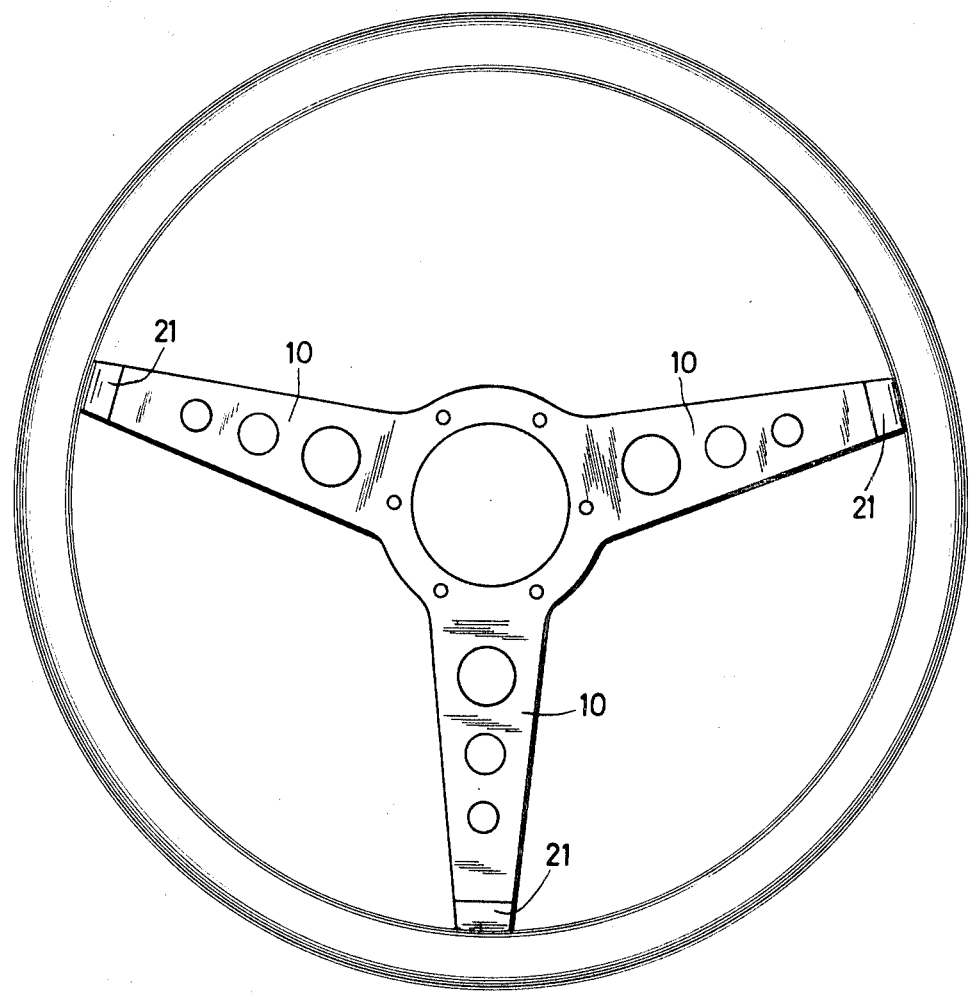

United States Patent

[11] 3,576,139

| [72] | Inventor | Giovanni Conterno<br>Vedano Olona Varese, Italy |
|---|---|---|
| [21] | Appl. No. | 806,107 |
| [22] | Filed | Mar. 11, 1969 |
| [45] | Patented | Apr. 27, 1971 |
| [73] | Assignee | Personal S.a.s.<br>Milan, Italy |
| [32] | Priority | Mar. 16, 1968 |
| [33] | | Italy |
| [31] | | 14090A/68 |

[54] A STEERING WHEEL HAVING A RIM WITH A LINING SECURED THEREON
3 Claims, 4 Drawing Figs.

[52] U.S. Cl. .................................................. 74/552,
29/159
[51] Int. Cl. ...................................................... G05g 1/10
[50] Field of Search .......................................... 74/552,
558, 558.5; 29/159 (B); 264/(Inquired)

[56] References Cited
UNITED STATES PATENTS
3,222,952  12/1965  Frye .............................. 74/552
FOREIGN PATENTS
980,673   1/1965  Great Britain ................ 74/552

*Primary Examiner*—Milton Kaufman
*Attorney*—Waters, Roditi, Schwartz & Nissen

ABSTRACT: A lined steering wheel rim is disclosed, which comprises a core having a U-shaped cross section and a resilient cushioning member surrounding the core partially. A liner surrounds the cushioning member and has free edges slipped into the interior of the U-shaped chamber of the core. Blocks lock the edges of the liner in position by snugly engaging the inner confronting faces of the U-shaped inner space of the core.

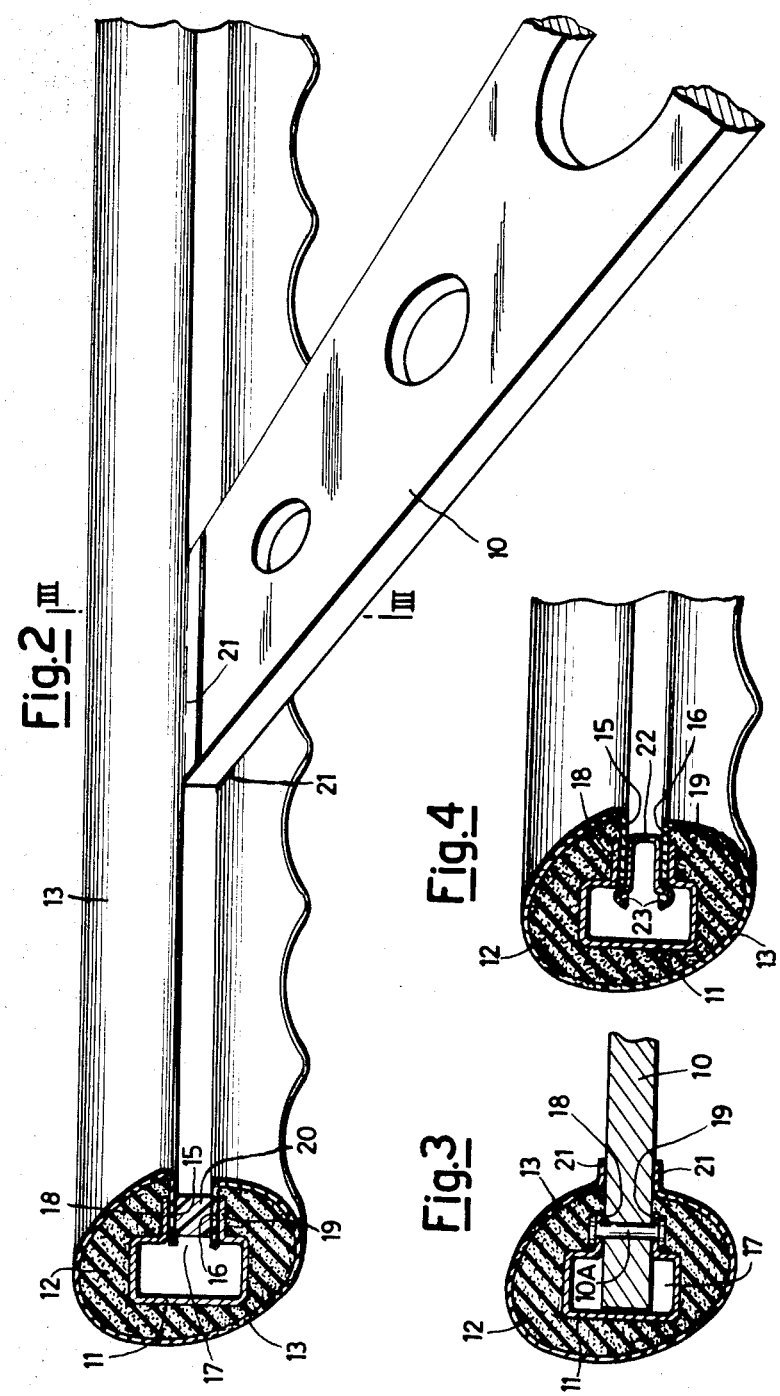

A STEERING WHEEL HAVING A RIM WITH A LINING SECURED THEREON

This invention relates to a steering wheel having a rim covered with a lining.

A few years ago, the use of a steering wheel, whose rim is covered with a lining has become popular: these wheels substantially comprise an inner core of resisting structure, generally of metal, embedded in a circular supporting member forming the steering wheel rim proper whose outer face carries the above indicated lining or covering. These supporting members have been made both of stiff and yieldable materials. In general, as it appears from the state of the prior art and the patent literature, the lining is bonded to the supporting member and its free edges are secured one to the other by stitching, binding or other means, such as zip fasteners.

In this connection a few approaches can be cited: among the most recent ones, the following can be enumerated:

1. German Pat. No. 1,194,273 (corresponding to the British Pat. No. 980,673) wherein a rubber supporting member is employed for enclosing a solid core and having a lining.
2. German Utility Model No. 1,834,357 which provides for a sponge rubber supporting member with a lining and wherein a zip fastener, integral with the supporting member, is provided for circumferentially closing the lining within the rim. Also in this case the inner core is solid.
3. German Model of Utility No. 1,982,841 comprises a solid metal core and a circumferential overstitching of the adjoining edges of the lining.

In these types of linings a number of shortcomings have been experienced, which can be summarized as follows:

overstitching the lining is a manual operation, which is time consuming and expensive;

as accurate as the overstitching may be, it is in any case a disturbing factor when the steering wheel rim is seized, especially during long periods of travel;

the mere glueing of the lining falls far short from ensuring the adhesion to the underlying supporting member: in point of fact, it exhibits a tendency towards jutting up at the edges.

The object of the present invention is to eliminate the drawbacks enumerated in the foregoing, by providing a lining capable of ensuring the junction of the lining edges while dispensing with overstitching or any like protrusions from the gripping surface of the wheel.

This object is achieved by a wheel having its rim covered with a lining, characterized in that the rim comprises a core formed by a metal profile, obtained by deep drawing and having a cross-sectional shape substantially in the form of a U, a supporting member made of a resiliently yieldable material, preferably of rubber, which encases said core along the entire cross section thereof, with the only exception of the open portion of said U, a lining glued to the outer face of said supporting member and whose exposed edges enter into the interior of the supporting member so as to respectively engage substantially one side of the U section from the inner face thereof, and locking means, in the form of blocks, adapted to engage internally and snugly the sides of the U-shaped profile.

In so doing, a locking action is obtained which is reliable and simultaneously satisfactory from an aesthetical point of view for the attachment of the lining to the supporting member and the reinforcing core. In addition, the lining is affixed not only by glueing, but also directly to the reinforcing core, which is necessarily stiff, rather than the supporting member, the possibility being thus reduced of a separation of a portion of the free edges of the lining from one another.

It should be noted that the boxlike structure of the core holds the supporting member surrounding it without glueing or any other means, such as would be required with a core having a simple U-shape.

This invention will be now described by way of nonlimiting example with reference to the accompanying drawings, wherein:

FIG. 1 is a general plan view of the steering wheel,
FIG. 2 is a perspective view, partly in section, of a portion of the steering wheel of FIG. 1,
FIG. 3 is a cross-sectional view taken along the line III-III of FIG. 2, and
FIG. 4 is a view similar to FIG. 3 which shows an alternative embodiment of the block-shaped affixing means.

Referring principally to FIGS. 1, 2 and 3 the steering wheel according to the present invention comprises three spokes 10, to which an aluminum core 11, having a cross-sectional shape substantially in the form of an internally hollow U, is affixed by rivets 10A.

The core 11 is straddled, along its entire circumference, by a rubber supporting member 12 to which a lining 13 is glued. The lining 13 has edges 15—16 curled inwardly into the interior of the space 17 formed by the sides 18—19 of the U-shaped core 11. The edges 15—16 are firmly fastened to the sides 18—19 by means of a block 20: the latter is preferably made, for example, of a plastics material or aluminum and is snugly driven between the sides of the U along the circumference of the core, in the arcs confined between the spokes 10.

At the point where the spokes 10 are connected in the core 11, the lining 13 has ears 21 which completely conceal the connection of the spokes to the rim. It should be noted that by this manner of fastening the lining, the corresponding borders of the resilient supporting member are drawn against the exterior of the sides of the U of the core, so that any deformation of the supporting member is prevented.

FIG. 4 shows an alternative embodiment wherein, rather than the block 20, a rolled section 22 is used, which is substantially U-shaped and has two flanges 23, which are adapted to snap into the internal space of the core 11, thus providing a considerable resistance against the unthreading of the rolled section itself.

Likewise, the block 20, or the rolled section 22 could be seated in the outer periphery of the rim of the steering wheel: if so, the core 11, the supporting member 12 and the lining 13 would be angularly shifted through 180° with respect to the axial circumference of the steering wheel rim.

The advantages afforded by the construction according to the present invention can be summarized as follows:

an increase in production since it is apparent that the time which is necessary to drive the block for affixing the liner is shorter than that required for overstitching and trimming; in addition the cost of the block is low inasmuch as it is rolled section;

the rim obtained with such a cross-sectional shape is stiffer, since the resistant cross section has been increased.

I claim:

1. A steering wheel comprising a rim including a core having a boxlike profile with a cross-sectional shape substantially in the form of a U, a supporting member of a resiliently yielding material encasing the core along the entire cross section thereof except for the open portion of the U, a lining externally secured on the supporting member and having free edges which enter the interior of the supporting member at said U so as to engage each side of the core at said U, and block-shaped locking means inserted into said U to snugly hold said free edges against the sides of the core at said U.

2. A steering wheel according to claim 1 wherein the U-shaped cross section of the core and the supporting member have open portions facing inwardly towards the center of the steering wheel and said block has a rectangular cross section and is constituted of a relatively stiff material.

3. A steering wheel according to claim 1 wherein said block is a U-shaped rolled section with resilient flanges whose ends are spread apart and engaged with a snapping action against corresponding inner sides of the U-shaped core.